United States Patent
Tsuda

(10) Patent No.: US 10,068,168 B2
(45) Date of Patent: Sep. 4, 2018

(54) IC CARD AND IC MODULE

(71) Applicant: Kabushiki Kaisha Toshiba, Minato-ku (JP)

(72) Inventor: Yusuke Tsuda, Chiyoda (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/263,996

(22) Filed: Sep. 13, 2016

(65) Prior Publication Data

US 2017/0083808 A1    Mar. 23, 2017

(30) Foreign Application Priority Data

Sep. 17, 2015 (JP) ................................. 2015-184007

(51) Int. Cl.
| | |
|---|---|
| *G06K 19/00* | (2006.01) |
| *G06K 19/077* | (2006.01) |
| *G06Q 20/34* | (2012.01) |
| *G06K 19/07* | (2006.01) |
| *G07F 7/10* | (2006.01) |
| *G06K 17/00* | (2006.01) |

(52) U.S. Cl.
CPC ....... *G06K 19/07743* (2013.01); *G06K 19/07* (2013.01); *G06K 19/07745* (2013.01); *G06Q 20/3552* (2013.01); *G06Q 20/3558* (2013.01); *G07F 7/1008* (2013.01); *G06K 2017/0041* (2013.01)

(58) Field of Classification Search
USPC .......................... 235/435, 439, 451, 487, 492
See application file for complete search history.

(56) References Cited

U.S. PATENT DOCUMENTS

2004/0003166 A1   1/2004 Sekiya
2007/0136797 A1   6/2007 Tanabikiq et al.
(Continued)

FOREIGN PATENT DOCUMENTS

JP   2008-242998      10/2008
JP   2014-63302 A     4/2014

OTHER PUBLICATIONS

Extended European Search Report dated Feb. 13, 2017 in Patent Application No. 16187328.6.
(Continued)

*Primary Examiner* — Matthew Mikels
(74) *Attorney, Agent, or Firm* — Oblon, McClelland, Maier & Neustadt, L.L.P.

(57) ABSTRACT

An IC card has a data storage, a table storage and a processing unit. The data storage stores data. The table storage stores a data element table including profile information including, in association with each other: a profile identifier for identifying a profile that is a group (set) of data elements to be stored in the data storage, at the time of issuance; the data elements included in the profile; and data region identifiers indicating data regions that are reserved in the data storage to store the data elements. The processing unit stores, in the data region indicated by the data region identifier corresponding to the data elements, the data elements corresponding to the profile identifier, from the data element table stored in the table storage, in response to a processing request that includes the profile identifier and requests issuance processing.

8 Claims, 10 Drawing Sheets

(56) References Cited

U.S. PATENT DOCUMENTS

| | | | | |
|---|---|---|---|---|
| 2011/0107041 A1* | 5/2011 | Donatiello | .......... | G06F 12/0246 |
| | | | | 711/160 |
| 2012/0157047 A1* | 6/2012 | Chen | .................... | H04W 12/06 |
| | | | | 455/411 |
| 2015/0081972 A1 | 3/2015 | Tuda | | |

OTHER PUBLICATIONS

Singapore Search Report and Written Opinion dated May 23, 2017, in Patent Application No. 10201607452T, filed Sep. 7, 2016.

* cited by examiner

| PROFILE NUMBER | ENTIRE PROFILE LENGTH | DATA LENGTH OF DATA ELEMENT 1 | DATA ELEMENT 1 | ID OF EF | OFFSET VALUE | ... | DATA LENGTH OF DATA ELEMENT n | DATA ELEMENT n | ID OF EF | OFFSET VALUE |
|---|---|---|---|---|---|---|---|---|---|---|
| 1 | XXX | 4 | AAAAAAAAh | XX01 | 0 | ... | 5 | BBBBBBBBBBh | XX03 | XX |
| 2 | YYYY | 4 | BBBBBBBBh | XX02 | 0 | ... | 3 | 555555h | XX04 | XX |
| ... | ... | ... | ... | ... | ... | ... | ... | ... | ... | ... |
| N | ZZZZ | 5 | AAAAAAAAAAh | XX05 | 0 | ... | 3 | AAAAAAh | XX04 | XX |

FIG. 5

| CLA | INS | P1 | P2 | Lc | Command Data |
|---|---|---|---|---|---|

FIG. 6

IC CARD AND IC MODULE

CROSS-REFERENCE TO RELATED APPLICATION

This application is based upon and claims the benefit of priority from the prior Japanese Patent Application No. 2015-184007, filed on Sep. 17, 2015, the entire contents of which are incorporated herein by reference.

FIELD

Embodiments of the present invention relate to an IC card and IC module.

BACKGROUND

In recent years, IC cards having a built-in IC (Integrated Circuit) chip have been widely used. In such IC cards, an issuance process for writing, in a non-volatile memory in the IC chip, information required for the operations of the IC card adapted for its purpose, using a writing request command, is executed.

However, in conventional IC cards, the issuer needs to check the specification of each issuance data set and register each issuance data set in a database or the like that the issuing device refers to, and this is burdensome to the issuer. In addition, in the conventional IC cards, a writing request command including data to be written needs to be executed on each set of all the data that needs to be written, and there was a possibility that the time required for the issuance is extremely long.

BRIEF DESCRIPTION OF THE DRAWINGS

FIG. 5 is a diagram showing an example of a data element table of the first embodiment;

FIG. 6 is a diagram showing an example of a command format received by the IC card of the first embodiment;

DETAILED DESCRIPTION

An IC card according to some embodiments has a data storage, a table storage and a processing unit. The data storage stores data. The table storage stores a data element table including profile information including, in association with each other: a profile identifier for identifying a profile that is a group (set) of data elements to be stored in the data storage, at the time of issuance; the data elements included in the profile; and data region identifiers indicating data regions that are reserved in the data storage to store the data elements. The processing unit stores the data elements corresponding to the profile identifier, from the data element table stored in the table storage, in the data region indicated by the data region identifier corresponding to the data elements, in response to a processing request that includes the profile identifier and requests issuance processing.

An IC card and IC module of embodiments will be described below with reference to the drawings.

First Embodiment

Figure 1:
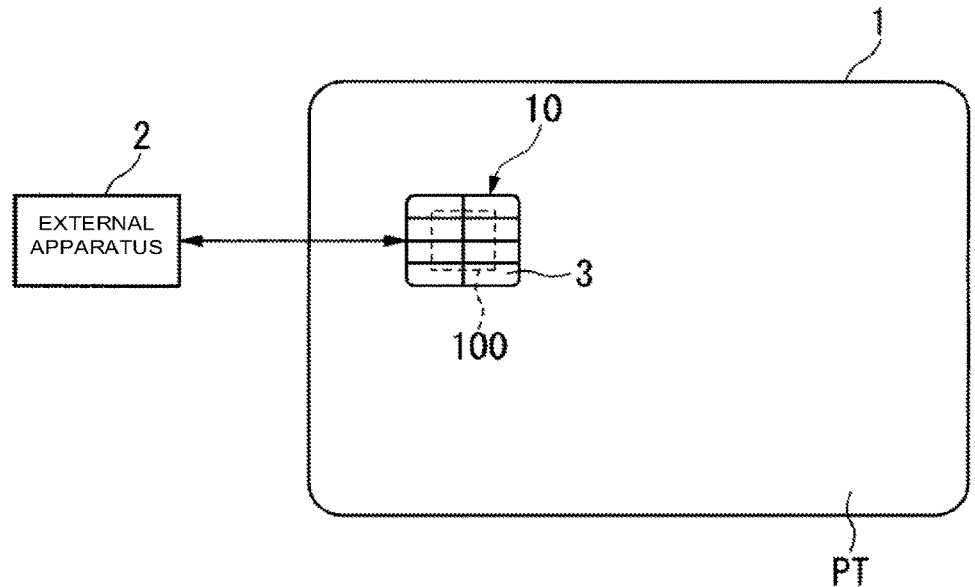
FIG. 1 is an external view of an example of an IC card of a first embodiment.

FIG. 1 is an external view of an example of an IC card 1 of a first embodiment.

As shown in FIG. 1, the IC card 1 is provided with an IC module 10. If the IC card 1 is a contact-type IC card, the IC module 10 is provided with a contact portion 3 and an IC chip 100. Note that if the IC card 1 is a contactless-type IC card, the IC module 10 is provided with an antenna part and the IC chip 100. For example, the IC card 1 is formed by implementing the IC module 10 on a card substrate PT (an example of a card body) made of plastic. In other words, the IC card 1 is provided with the IC module 10, and the card substrate PT in which the IC module 10 is embedded. Moreover, the IC card 1 can communicate with an external apparatus 2 via the contact portion 3.

For example, the IC card 1 receives, via the contact portion 3, a command (processing request) transmitted by the external apparatus 2, and executes processing (command processing) corresponding to the received command. The IC card 1 then transmits a response (processing response) that is an execution result of the command processing to the external apparatus 2 via the contact portion 3.

Here, the external apparatus 2 is a host apparatus that communicates with the IC card 1, and is a reader/writer or the like.

The IC module 10 is provided with the contact portion 3 and the IC chip 100, and, for example, is a module traded in a form such as a COT (Chip On Tape) in which a plurality of IC modules 10 are arranged on a tape. Note that there are cases where a single IC module 10 separated from a tape by single chip punching is called a COT.

The contact portion 3 has various signal terminals required for the IC card 1 to operate. Here, the various signal terminals include terminals that receive supply of power supply voltages, a clock signal, a reset signal and the like from the external apparatus 2, and a serial data input/output terminal (SIO terminal) for communicating with the external apparatus 2.

The IC chip 100 is an LSI (Large Scale Integration) chip such as a one-chip microprocessor, for example.

Next, the hardware configuration of the IC card 1 of this embodiment will be described with reference to FIG. 2.

Figure 2:
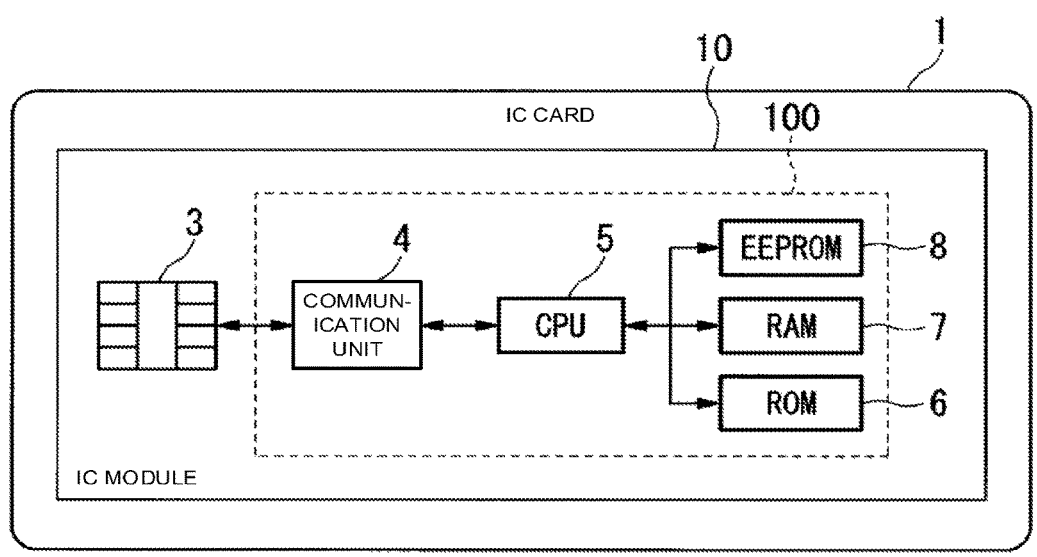
FIG. 2 is a diagram showing an example of a hardware configuration of the IC card of the first embodiment.

FIG. 2 is a diagram showing an example of the hardware configuration of the IC card 1 of this embodiment.

As shown in FIG. 2, the IC card 1 is provided with the IC module 10 provided with the contact portion 3 and the IC chip 100. The IC chip 100 is provided with a communication unit 4, a CPU (Central Processing Unit) 5, a ROM (Read Only Memory) 6, a RAM (Random Access Memory) 7 and an EEPROM (Electrically Erasable Programmable ROM) 8.

The CPU 5 is a processor, and the ROM 6, the RAM 7 and the EEPROM 8 are memories.

The communication unit 4 is provided with a communication interface, and performs communication between the IC card 1 and the external apparatus 2 (transmission/reception of commands/responses). For example, the communication unit 4 receives, from the external apparatus 2, various commands such as an issuance command (issuance processing request) that request issuance processing for setting, in the EEPROM 8, personal information, information for internal control and the like. Also, the communication unit 4 transmits, to the external apparatus 2, responses that are execution results of processing corresponding to the various commands.

The CPU 5 executes programs stored in the ROM 6 or the EEPROM 8, and performs various types of processing of the IC card 1. For example, the CPU 5 executes command processing corresponding to a command received by the communication unit 4 via the contact portion 3.

The ROM 6 is a non-volatile memory such as a mask ROM. The ROM 6 stores programs for executing various types of processing of the IC card 1, and data such as a command table.

The RAM 7 is a volatile memory such as an SRAM (Static RAM). The RAM 7 temporarily stores data used when the various types of processing of the IC card 1 are performed.

The EEPROM 8 is an electrically rewritable non-volatile memory. The EEPROM 8 stores various types of data used by the IC card 1. For example, the EEPROM 8 stores a user name, a user ID, a card ID, various types of key information, information for internal control and the like in accordance with the purpose of the IC card 1.

Next, an example of a functional configuration of the IC card 1 according to this embodiment will be described with reference to FIG. 3.

Figure 3:
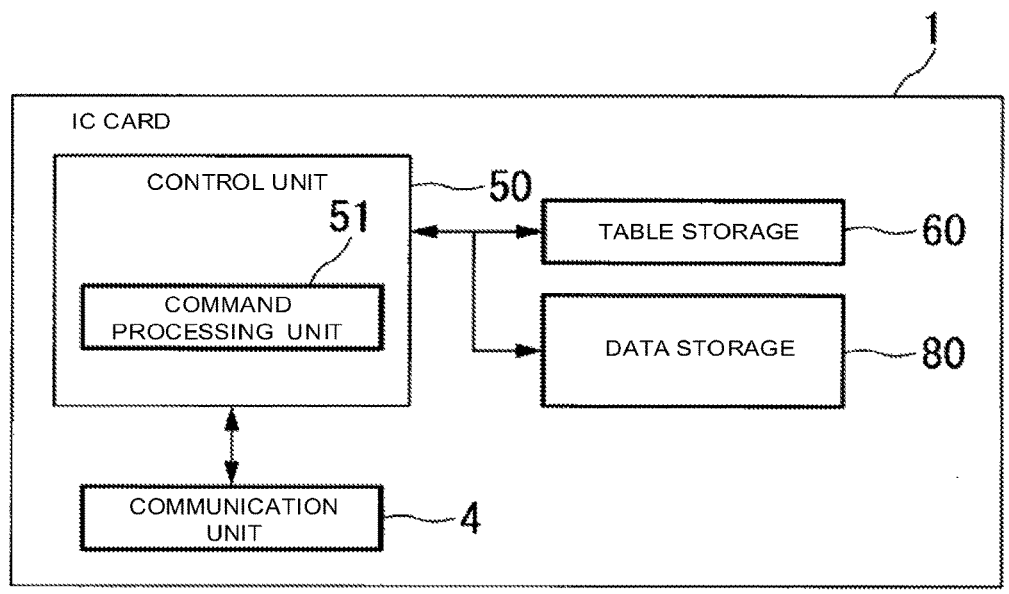
FIG. 3 is a block diagram showing an example of a functional configuration of the IC card of the first embodiment.

FIG. 3 is a block diagram showing an example of the functional configuration of the IC card 1 of this embodiment.

As shown in FIG. 3, the IC card 1 is provided with the communication unit 4, a control unit 50, a table storage 60 and a data storage 80.

Here, each constituent element of the IC card 1 shown in FIG. 3 is realized by using the hardware of the IC card 1 that is shown in FIG. 2.

For example, the data storage 80 is constituted by the EEPROM 8, and stores various types of data for the purpose of the IC card 1. In the data storage 80, a DF (Dedicated File) adapted for the application and EFs (Elementary Files) that store various types of data used in the application and data for internal control are built (secured) based on the file configuration such as shown in FIG. 4, by the issuance of the IC card 1.

Figure 4:
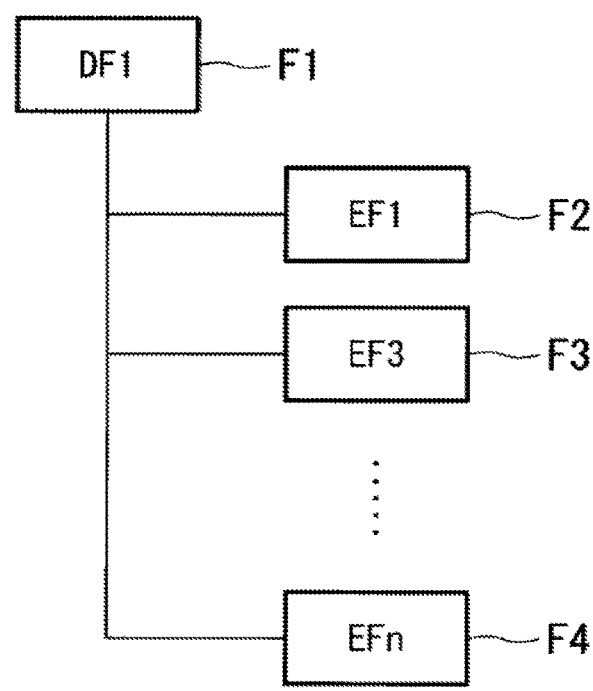
FIG. 4 is a diagram showing an example of a file configuration of the IC card of the first embodiment.

FIG. 4 is a diagram showing an example of a file configuration of the IC card 1 of this embodiment. In the configuration example shown in FIG. 4, "EF1" (F2), "EF3" (F3) . . . , "EFn" (F4) are arranged under "DF1" (F1).

In addition, in the data storage 80, data is stored in the built (reserved) EFs, by the processing for issuing the IC card 1.

For example, the table storage 60 is constituted by the ROM 6 or the EEPROM 8, and stores profile information including issuance data (data elements) that is stored in the data storage 80 at the time of processing for issuing the IC card 1. Specifically, the table storage 60 stores a data element table containing the profile information in which at least a profile number (an example of a profile identifier), data elements included in the profile and the IDs of EFs (an example of a data region identifier) indicating data regions (files, for example, EFs) in which the data elements are to be stored are associated. Here, the profile is a group of data elements that are stored in the data storage 80 at the time of issuance, for example. A "data element" is data that can be considered as one data unit, such as the issuance data to be stored in an EF, for example.

As shown in FIG. 5, the table storage 60 stores, as a data element table, profile information corresponding to a plurality of profiles for issuance.

FIG. 5 is a diagram showing an example of a data element table of this embodiment.

In FIG. 5, for example, the table storage 60 stores profile information in which "profile number", "entire profile length", "data length of data element 1", "data element 1", "ID of EF", "offset value", . . . "data length of data element n", "data element n", "ID of EF" and "offset value" are associated with each other. Here, the "profile number" is an example of a profile identifier for identifying a profile, and the "entire profile length" indicates the data length of the entire profile. In other words, the "entire profile length" is the data length from the beginning of the "data length of data element 1" to the end of the "offset value" of the "data element n".

Also, the "data length of data element 1" indicates the data length of the "data element 1", and the "data element 1" indicates data to be stored as a content of the data element 1 in an EF. Moreover, the "ID of EF" is an example of a data region identifier for identifying an EF in which a data element is stored, and the "offset value" indicates an offset value in the EF in which the data element is stored. Note that the "data length of data element 1", the "data element 1", the "ID of EF" and the "offset value" that are consecutively stored are information corresponding to the "data element 1", and the "data length of data element n", the "data element n", the "ID of EF" and the "offset value" are information corresponding to the "data element n".

The example shown in FIG. 5 indicates that the "entire profile length" corresponding to the "profile number" "1" is "XXXX", the "data length of data element 1" is "4" (4 bytes), and the "data element 1" is "AAAAAAAAh". Here, "h" indicates hexadecimal notation. Also, the example shown in FIG. 5 indicates that the "ID of EF" in which the "data element 1" ("AAAAAAAAh") is to be stored is "XX01", and that the "offset value" is "0" (the data element 1 is stored, starting from the first byte from the beginning).

Similarly, the example shown in FIG. 5 indicates that the "data length of data element n" corresponding to the "profile number" "1" is "5" (5 bytes), and that the "data element n" is "BBBBBBBBBBh". It is also indicated that the "ID of EF" in which the "data element n" ("BBBBBBBBBBh") is to be stored is "XX03", and the "offset value" is "XX" (the data element n is stored, starting from the XX+1st byte from the beginning).

Note that in the example shown in FIG. 5, the table storage 60 stores, as a data element table, N sets of profile information corresponding to the profile numbers 1 to N. Also, the data elements stored in the table storage 60 are setting data for determining the operations of the application, the version information of the application and the like, and the data elements do not include information that is different for each IC card 1 such as personal information. In other words, the table storage 60 stores a plurality of data sets that are each determined in advance in accordance with the application, for example.

For example, the control unit 50 is realized by the CPU 5, the RAM 7, the ROM 6 and the EEPROM 8, and integrally controls the IC card 1. For example, the control unit 50 executes processing for various commands (command processing) transmitted from the external apparatus 2 to the IC card 1. Also, the control unit 50 is provided with a command processing unit 51, for example.

The command processing unit 51 (an example of a processing unit) executes various types of command processing in accordance with various commands (processing requests) received from the external apparatus 2 via the communication unit 4. The command processing unit 51 transmits responses (processing responses), which are execution results of the various types of the command processing, via the communication unit 4 to the external apparatus 2. Here, a command format received by the IC card 1 of this embodiment will be described with reference to FIG. 6.

FIG. 6 is a diagram showing an example of the command format received by the IC card 1 of this embodiment. The command format in FIG. 6 is an APDU (Application Protocol Data Unit) format of a command telegram.

In FIG. 6, for example, the APDU format includes "CLA" (class byte), "INS" (instruction byte), "P1" (parameter 1), "P2" (parameter 2), "Lc" (data length) and "Command Data" (command data).

In this embodiment, for example, in an INSTALL command that is one of the commands requesting issuance processing (hereinafter, referred to as an issuance command), a profile number as described above is set as the install parameter of "Command Data", and the INSTALL command is transmitted from the external apparatus 2 to the IC card 1.

Returning to the description with reference to FIG. 3, in response to the issuance command that includes a profile number, the command processing unit 51 stores data elements corresponding to the profile number, from a data element table stored in the table storage 60, in EFs corresponding to the data elements. For example, in response to the INSTALL command in which the profile number is set as the install parameter, the command processing unit 51 extracts profile information corresponding to the profile number from the data element table stored in the table storage 60. The command processing unit 51 builds EFs (reserves data regions) under the DF based on the extracted profile information corresponding to the profile number, and stores the data elements included in the profile information (issuance data) in the respective EFs that have been built (reserved).

For example, if "1" is set as a profile number by the install parameter of an INSTALL command, in the example of a data element table shown in FIG. 5, the command processing unit 51 builds (reserves) an EF whose ID is "XX01", and stores "AAAAAAAAh", starting from the "1" st byte of the EF "XX01". The command processing unit 51 also builds (reserves) an EF whose ID is "XX03", and stores "BBBBBBBBBBh", starting from the "XX+1" st byte of the EF "XX03".

In this manner, the command processing unit 51 reserves, in the data storage 80, EFs in which data elements are to be stored in response to an issuance command (e.g., an INSTALL command), and stores, in the reserved EFs, the data elements corresponding to the profile number, from a data element table stored in the table storage 60.

Next, the operations of the IC card 1 of this embodiment will be described with reference to the drawings.

Figure 7:
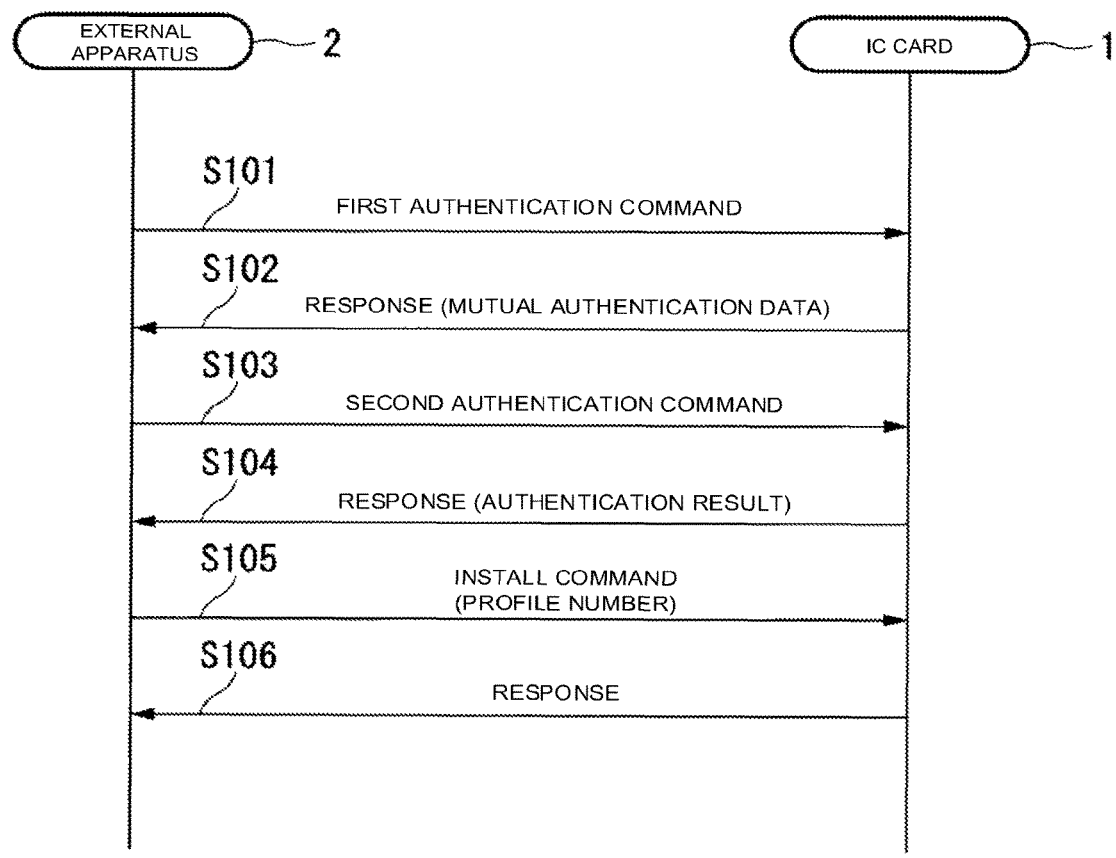
FIG. 7 is a diagram showing an example of an issuance procedure of the IC card of the first embodiment.

FIG. 7 is a diagram showing an example of an issuance procedure of the IC card 1 of this embodiment.

Note that in the example shown in FIG. 7, the IC card 1 will be described assuming that a data element table is stored in the table storage 60 in advance.

In a state in which the external apparatus 2 and the IC card 1 are connected via the contact portion 3 and the IC card 1 is activated as shown in FIG. 7, the external apparatus 2 transmits a first authentication command to the IC card 1 in order to execute mutual authentication (step S101). Here, for example, the first authentication command is an INITIALIZE UPDATE command, and is a command for executing processing for exchanging random number data required for the mutual authentication. The external apparatus 2 transmits, to the IC card 1, first random number data (host challenge) generated by the external apparatus 2, by the INITIALIZE UPDATE command.

Next, upon receiving the INITIALIZE UPDATE command, the IC card 1 executes INITIALIZE UPDATE command processing. As the INITIALIZE UPDATE command processing, for example, the IC card 1 generates a ciphered text that is based on the received first random number data, and generates second random number data (card challenge). The IC card 1 transmits, to the external apparatus 2, a response that includes the second random number data and the ciphered text generated in the IC card 1 as data for authentication (step S102).

Next, the external apparatus 2 compares the ciphered text included in the response to the INITIALIZE UPDATE command and a ciphered text generated by the external apparatus 2 based on the first random number data, and authenticates the IC card 1. Here, if the two ciphered texts do not match, the external apparatus 2 determines that the IC card 1 is not an authorized card, and stops the issuance processing.

If the two ciphered texts match, the external apparatus 2 transmits a second authentication command to the IC card 1 in order to execute mutual authentication (step S103). Here, the second authentication command is an EXTERNAL AUTHENTICATE command, for example, and is a command for executing processing for authenticating the external apparatus 2 as a portion of the mutual authentication. The external apparatus 2 generates a ciphered text that is based on the second random number data received from the IC card 1, and transmits the EXTERNAL AUTHENTICATE command including the ciphered text to the IC card 1.

Next, upon receiving the EXTERNAL AUTHENTICATE command, the IC card 1 executes EXTERNAL AUTHENTICATE command processing. As the EXTERNAL AUTHENTICATE command processing, the IC card 1 compares the received ciphered text and the ciphered text generated by the IC card 1 based on the second random number data, and authenticates the external apparatus 2. The IC card 1 transmits, to the external apparatus 2, a response that includes the result of comparing the two ciphered texts as an authentication result (step S104).

Next, if the received authentication result indicates that the two ciphered texts do not match, the external apparatus 2 determines that the IC card 1 is not an authorized card, and stops the issuance processing. If the authentication result indicates that the two ciphered texts match, the external apparatus 2 transmits an INSTALL command including a profile number to the IC card 1 (step S105). For example, the external apparatus 2 transmits, to the IC card 1, the INSTALL command in which a profile number corresponding to the application for issuance is set as the install parameter.

Next, upon receiving the INSTALL command that includes the profile numbers, the IC card 1 executes INSTALL command processing. The command processing unit 51 of the IC card 1 refers to the data element table stored in the table storage 60, and acquires profile information corresponding to the profile number. The command processing unit 51 executes building of EFs (reservation of data regions) whose IDs are included in the acquired profile information, and stores, in the EFs, data elements corresponding to the respective EFs whose IDs are included in the profile information. When the INSTALL command processing is complete, the IC card 1 transmits a response to the external apparatus 2 (step S106).

As described above, in the IC card 1 of this embodiment, issuance processing is executed without transmitting issuance data from the external apparatus 2, by the INSTALL command.

Note that when information different for each IC card 1 such as personal information is stored, processing for issuing the IC card 1 is executed using another issuance command (e.g., a STORE DATA command).

Next, the internal processing of the IC card 1 will be described with reference to FIGS. 8 and 9.

Figure 8:
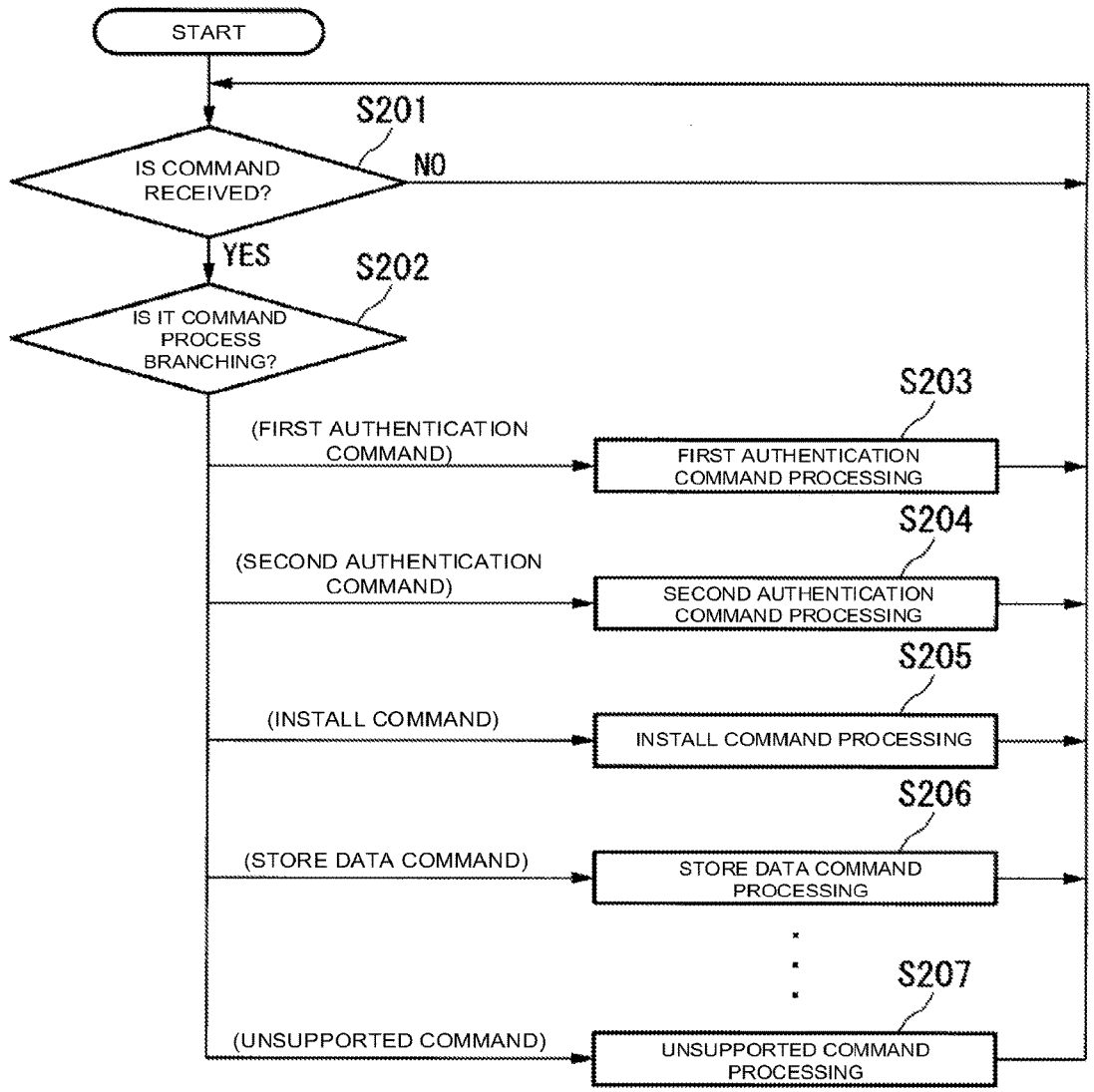
FIG. 8 is a flowchart showing an example of command processing of the IC card of the first embodiment.

FIG. 8 is a flowchart showing an example of command processing of the IC card 1 of this embodiment.

As shown in FIG. 8, when connected to the external apparatus 2 and activated, the IC card 1 enters a command waiting state, and determines whether or not a command has been received (step S201). Specifically, the control unit 50 of the IC card 1 determines whether or not a command has been received from the external apparatus 2 via the communication unit 4. If a command has been received (step S201: YES), the control unit 50 advances the procedure to step S202. If a command has not been received (step S201: NO), the control unit 50 returns the procedure to step S201.

In step S202, the command processing unit 51 of the control unit 50 executes command processing branching (i.e. the procedure branches depending on the command). For example, if the received command is a first authentication command (e.g., an INITIALIZE UPDATE command), the command processing unit 51 advances the procedure to step S203, and executes first authentication command processing.

If the received command is a second authentication command (e.g., an EXTERNAL AUTHENTICATE command), the command processing unit 51 advances the procedure to step S204, and executes second authentication command processing.

If the received command is an INSTALL command, the command processing unit 51 advances the procedure to step S205, and executes INSTALL command processing.

If the received command is a STORE DATA command, the command processing unit 51 advances the procedure to step S206, and executes STORE DATA command processing.

If the received command is an unsupported command, the command processing unit 51 advances the procedure to step S207, and executes unsupported command processing.

In step S203, for example, the command processing unit 51 executes the above-described INITIALIZE UPDATE command processing, and transmits a response to the external apparatus 2. After the processing of step S203, the command processing unit 51 returns the procedure to step S201.

In step S204, for example, the command processing unit 51 executes the above-described EXTERNAL AUTHENTICATE command processing, and transmits a response to the external apparatus 2. After the processing of step S204, the command processing unit 51 returns the procedure to step S201.

In step S205, the command processing unit 51 executes the INSTALL command processing, and transmits a response to the external apparatus 2. After the processing of step S205, the command processing unit 51 returns the procedure to step S201. Note that the INSTALL command processing will be described in detail later with reference to FIG. 9.

In step S206, the command processing unit 51 executes the STORE DATA command processing, and transmits a response to the external apparatus 2. After the processing of step S206, the command processing unit 51 returns the procedure to step S201.

In step S207, the command processing unit 51 executes the unsupported command processing. For example, the command processing unit 51 transmits, to the external apparatus 2, a response including information indicating that the command is not supported by the IC card 1. After the processing of step S207, the command processing unit 51 returns the procedure to step S201.

Next, the above-described INSTALL command processing of step S205 will be described with reference to FIG. 9.

Figure 9:
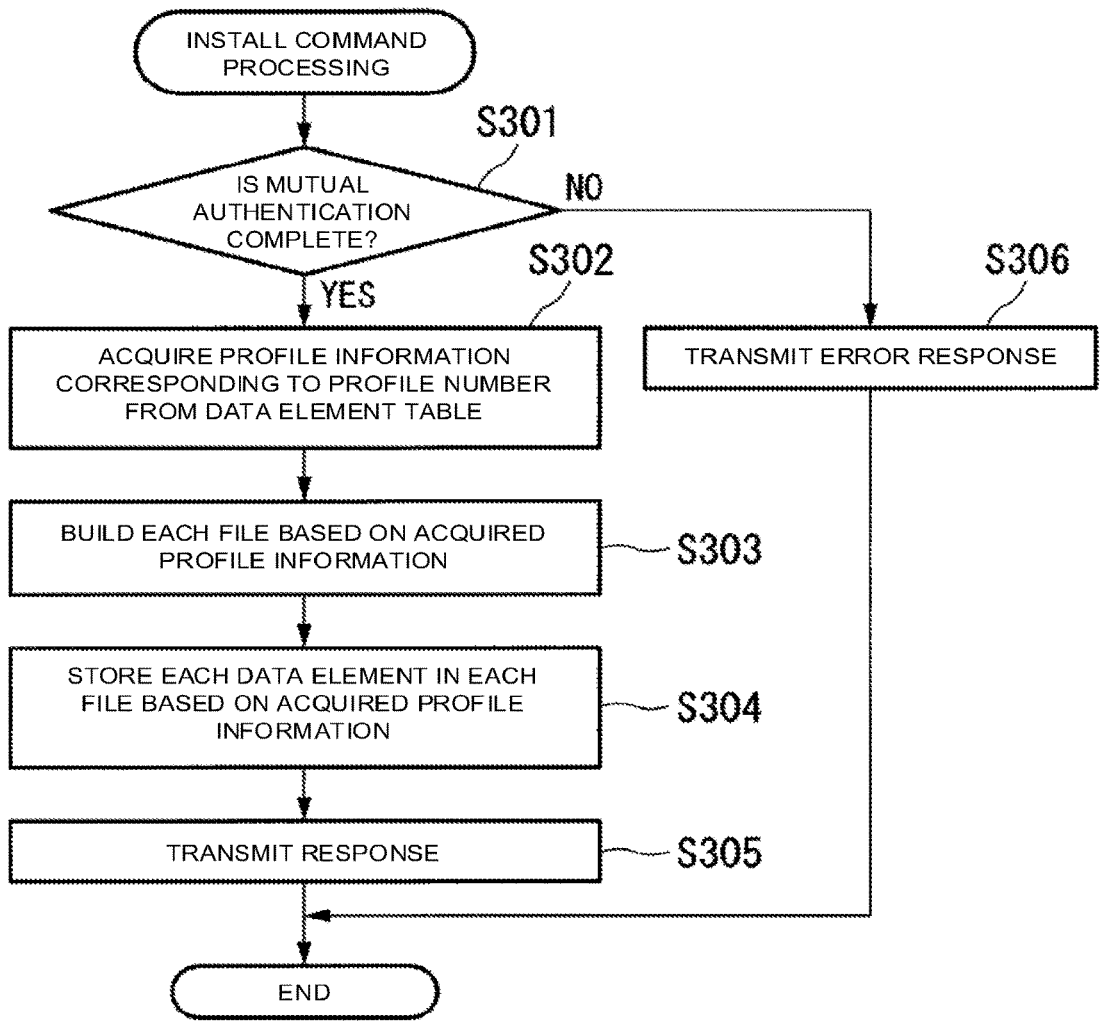
FIG. 9 is a flowchart showing an example of INSTALL command processing of the IC card of the first embodiment.

FIG. 9 is a flowchart showing an example of the INSTALL command processing of the IC card 1 of this embodiment.

As shown in FIG. 9, the command processing unit 51 of the IC card 1 first determines whether or not mutual authentication is complete (step S301). For example, the command processing unit 51 determines whether or not mutual authentication is complete, based on mutual authentication result information stored in the RAM 7. Note that, for example, the mutual authentication result information is flag information indicating whether or not mutual authentication has been normally executed and the validity of the external apparatus 2 has been confirmed. If mutual authentication is complete (step S301: YES), the command processing unit 51 advances the procedure to step S302. If mutual authentication is not complete (step S301: NO), the command processing unit 51 advances the procedure to step S306.

In step S302, the command processing unit 51 acquires profile information corresponding to profile numbers from a data element table. Specifically, the command processing unit 51 extracts the profile information corresponding to the profile number received from the external apparatus 2, from the data element table stored in the table storage 60, and acquires the extracted profile information.

Next, the command processing unit 51 builds each file (each EF) based on the acquired profile information (step S303). For example, the command processing unit 51 builds EFs (reserves data regions) whose IDs are included in the profile information such as that shown in FIG. 5, based on the profile information.

Next, the command processing unit 51 stores data elements in the respective files (EFs) based on the acquired profile information (step S304). The command processing unit 51 stores, in the EFs, the respective data elements included in the profile information, such as those shown in FIG. 5, based on the profile information.

Next, the command processing unit 51 transmits a response to the external apparatus 2 (step S305). Specifically, the command processing unit 51 transmits the response including information indicating an execution result of the INSTALL command processing to the external apparatus 2 via the communication unit 4. After the processing of step S305, the command processing unit 51 ends the INSTALL command processing.

In step S306, the command processing unit 51 transmits an error response to the external apparatus 2, and ends the INSTALL command processing. Here, the error response is a response including error information that indicates that the mutual authentication is not complete.

As described above, the IC card 1 according to this embodiment is provided with the data storage 80 that stores data, the table storage 60 and the command processing unit 51 (the processing unit). The table storage 60 stores a data element table in which profile numbers, data elements (issuance data) included in the profile and the IDs of EFs are associated with each other. Here, the profile number is an example of a profile identifier for identifying a profile that is a group of data elements stored in the data storage 80 at the time of issuance. Also, the ID of an EF is an example of a data region identifier that indicates a data region that is reserved in the data storage 80, and in which a data element is stored. In response to a processing request (e.g., an INSTALL command) that includes a profile number and requests issuance processing, the command processing unit 51 stores data elements corresponding to the profile number, from a data element table stored in the table storage 60, in data regions (EF) indicated by the IDs of the EFs corresponding to the data elements.

This enables the IC card 1 according to this embodiment to reduce the time required for issuance. In other words, in the IC card 1 according to this embodiment, the data elements (issuance data) in the data element table stored in advance in the table storage 60 are stored in the EFs, in issuance processing, and thus the external apparatus 2 does not need to transmit the issuance data included in the data element table to the IC card 1. Therefore, the IC card 1 according to this embodiment can reduce the number of times an issuance command such as a STORE DATA command is executed, for example. Therefore, the IC card 1 according to this embodiment can reduce the time required for issuance.

In addition, the issuance data is set in the data element table in advance, and thus the IC card 1 according to this embodiment can reduce the number of data elements prepared by the issuer. Therefore, the IC card 1 according to this embodiment can reduce the time required for preparing the issuance data, and reduce the risk that the issuer incorrectly sets the issuance data.

Moreover, data elements corresponding to a profile number are stored in the data storage 80, and thus in the IC card 1 according to this embodiment, data elements that are different depending on their profile number can be stored in the data storage 80. Therefore, the IC card 1 according to this embodiment can execute issuance processing that is appropriate for the application, for example.

Moreover, in the IC card 1 according to this embodiment, the number of data elements prepared by the issuer is reduced, and thus, by the amount of the reduction, issuance data does not need to be prepared in a database or the like that the issuing device refers to. In addition, the IC card 1 according to this embodiment can reduce the risk that the issuer incorrectly sets the issuance data.

In addition, in this embodiment, in response to a processing request (e.g., an INSTALL command) that requests issuance processing, the command processing unit 51 reserves, in the data storage 80, data regions (e.g., EFs) in which data elements are to be stored, and stores, in the reserved data regions (e.g., the EFs), the data elements corresponding to a profile number, from a data element table stored in the table storage 60.

This enables the IC card 1 according to this embodiment to reserve the data regions (for example, build the EFs) and store data (write issuance data) in single command processing. Therefore, the IC card 1 according to this embodiment can further reduce the time required for issuance.

Note that the table storage 60 of this embodiment may be realized by the ROM 6, and store a data element table in advance, or may be realized by the EEPROM 8, and store the data element table later. If the table storage 60 is realized by the EEPROM 8, in a process that precedes issuance processing, a data element table may be stored in the table storage 60, using command processing of the IC card 1, for example, or the data element table may be stored in the table storage 60 by other techniques that use command processing (e.g., a technique that uses an inspection mode). Note that if a data element table is stored in the table storage 60 by command processing, the command processing unit 51 stores the data element table in the table storage 60 in response to a command that requests processing for storing the data element table in the table storage 60, for example.

Accordingly, the data element table can be changed using the IC card 1, and thus the IC card 1 according to this embodiment can be flexibly adapted for issuance processing of various applications.

The IC card 1 according to this embodiment is provided with the data storage 80 that stores data, the table storage 60 and the command processing unit 51 (the processing unit). After a data element table is stored in the table storage 60, in response to a processing request (e.g., an INSTALL command) that includes an profile number and requests issuance processing, the command processing unit 51 stores, from a data element table stored in the table storage 60, data elements corresponding to the profile number, in data regions (EFs) indicated by the IDs of EFs corresponding to the data elements.

Accordingly, the IC card 1 according to this embodiment can be flexibly adapted for issuance processing of various applications, and reduce the time required for issuance.

The IC module 10 according to this embodiment is provided with the above-described data storage 80, table storage 60 and command processing unit 51.

Accordingly, the IC module 10 according to this embodiment has effects similar to those of the IC card 1.

Second Embodiment

Next, an IC card of a second embodiment will be described with reference to the drawings.

In this embodiment, an example will be described in which issuance processing that uses the above-described data element table is performed in a STORE DATA command that is an issuance command, in place of an INSTALL command.

Note that the configuration of an IC card 1a of this embodiment is similar to that in FIGS. 1 to 5, and thus its description is omitted.

Also, in response to the STORE DATA command, the command processing unit 51 according to this embodiment stores, from a data element table stored in the table storage 60, data elements corresponding to a profile number, in data regions (e.g., EFs) reserved in the data storage 80. Here, the command format of the STORE DATA command is the APDU format shown in FIG. 6, and for example, the above-described profile number is set as "Command Data", and is transmitted from the external apparatus 2 to the IC card 1*a*.

Figure 10:
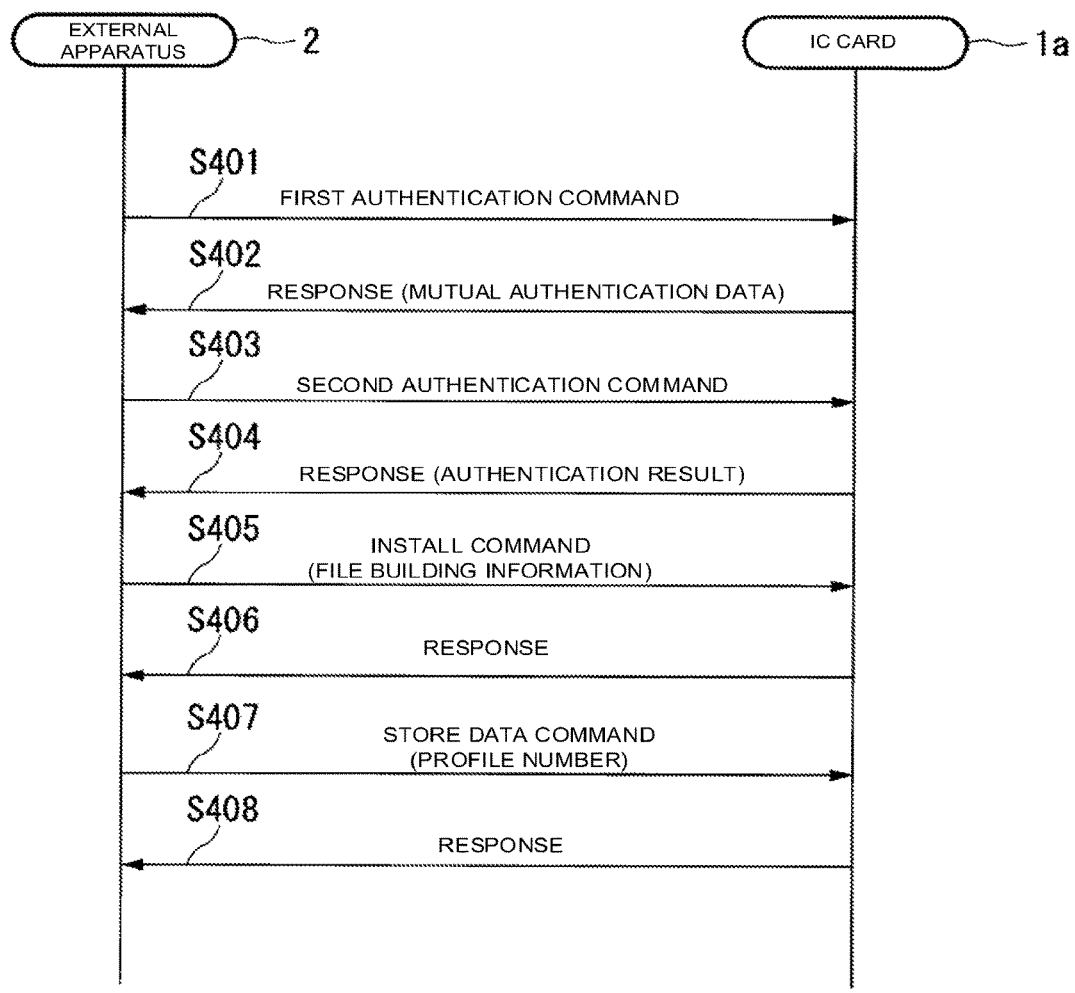
FIG. 10 is a diagram showing an example of an IC card issuance procedure of a second embodiment.

FIG. 10 is a diagram showing an example of an issuance procedure of the IC card 1*a* of this embodiment.

Note that in the example shown in FIG. 10, the IC card 1*a* will be described assuming that a data element table is stored in the table storage 60 in advance.

In FIG. 10, the processing of steps S401 to S404 is similar to the processing of steps S101 to S104 shown in FIG. 7, and thus its description is omitted here.

In step S405, the external apparatus 2 transmits an INSTALL command that includes file building information to the IC card 1*a*. Specifically, the external apparatus 2 transmits, to the IC card 1*a*, the INSTALL command in which file building information corresponding to the application for issuance is set as the install parameter, for example.

Next, upon receiving the INSTALL command that includes the file building information, the IC card 1*a* executes INSTALL command processing. The command processing unit 51 of the IC card 1*a* executes building of EFs, such as those shown in FIG. 4, based on the file building information. If the INSTALL command processing is complete, the IC card 1*a* transmits a response to the external apparatus 2 (step S406).

Next, the external apparatus 2 transmits a STORE DATA command including a profile number to the IC card 1*a* (step S407). For example, the external apparatus 2 transmits, to the IC card 1*a*, a STORE DATA command in which a profile number corresponding to the application for issuance is set as the above-described "Command Data". Note that this STORE DATA command includes a profile number corresponding to the application in place of write data (issuance data), and write data (issuance data) does not need to be transmitted to the IC card 1*a*.

Next, upon receiving the STORE DATA command that includes a profile number, the IC card 1*a* executes STORE DATA command processing. The command processing unit 51 of the IC card 1*a* references a data element table stored in the table storage 60, and acquires profile information corresponding to the profile number. The command processing unit 51 stores, in EFs, the contents of data elements corresponding to the EFs included in the acquired profile information. When the STORE DATA command processing is complete, the IC card 1*a* transmits a response to the external apparatus 2 (step S408).

As described above, in the IC card 1*a* of this embodiment, the EFs are built by the INSTALL command, and issuance processing is executed without issuance data being transmitted from the external apparatus 2, by the STORE DATA command.

Next, the internal processing of the IC card 1*a* of this embodiment will be described.

Command processing of the IC card 1*a* of this embodiment is similar to that of the first embodiment shown in FIG. 8, and thus its description is omitted here. Here, INSTALL command processing and STORE DATA command processing according to this embodiment will be described with reference to FIGS. 11 and 12.

First, the INSTALL command processing of step S205 shown in FIG. 8 will be described with reference to FIG. 11.

Figure 11:
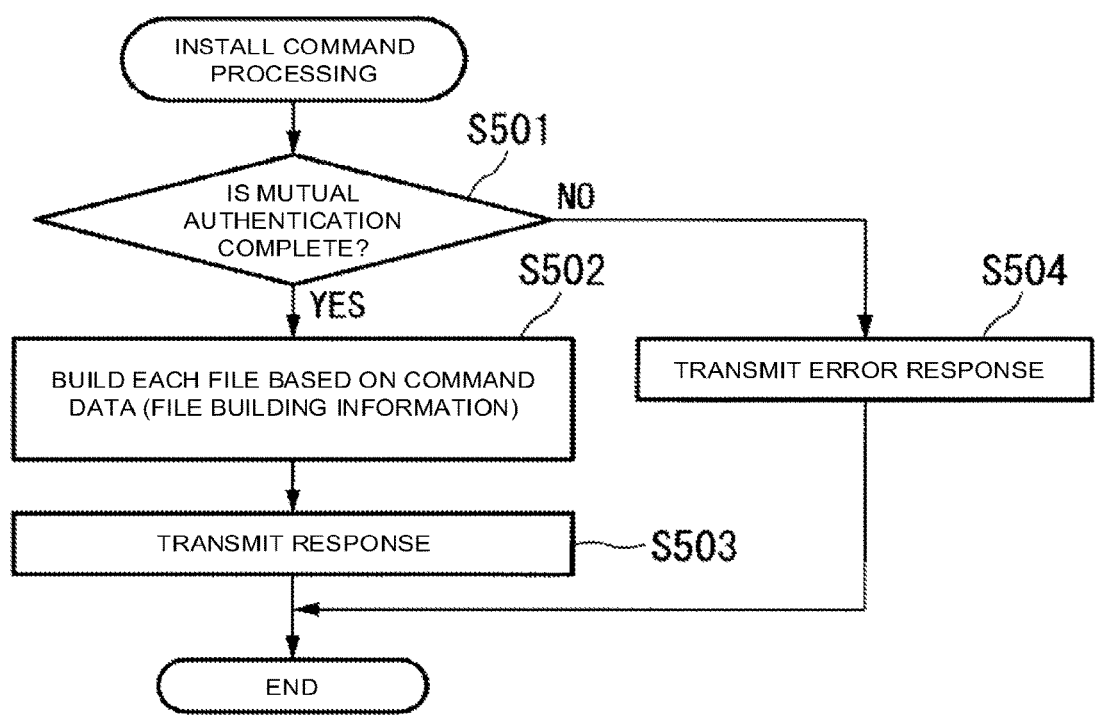
FIG. 11 is a flowchart showing an example of INSTALL command processing of an IC card of the second embodiment.

FIG. 11 is a flowchart showing an example of the INSTALL command processing performed by the IC card 1*a* of this embodiment.

As shown in FIG. 11, the command processing unit 51 of the IC card 1*a* first determines whether or not mutual authentication is complete (step S501). If mutual authentication is complete (step S501: YES), the command processing unit 51 advances the procedure to step S502. If mutual authentication is not complete (step S501: NO), the command processing unit 51 advances the procedure to step S504.

In step S502, the command processing unit 51 builds each file (each EF) (reserves data regions) based on command data (file building information).

Next, the command processing unit 51 transmits a response to the external apparatus 2 (step S503). Specifically, the command processing unit 51 transmits a response that includes information indicating an execution result of the INSTALL command processing, to the external apparatus 2 via the communication unit 4. After the processing of step S503, the command processing unit 51 ends the INSTALL command processing.

In step S504, the command processing unit 51 transmits an error response to the external apparatus 2, and ends the INSTALL command processing.

Next, the STORE DATA command processing of step S206 shown in FIG. 8 will be described with reference to FIG. 12.

Figure 12:
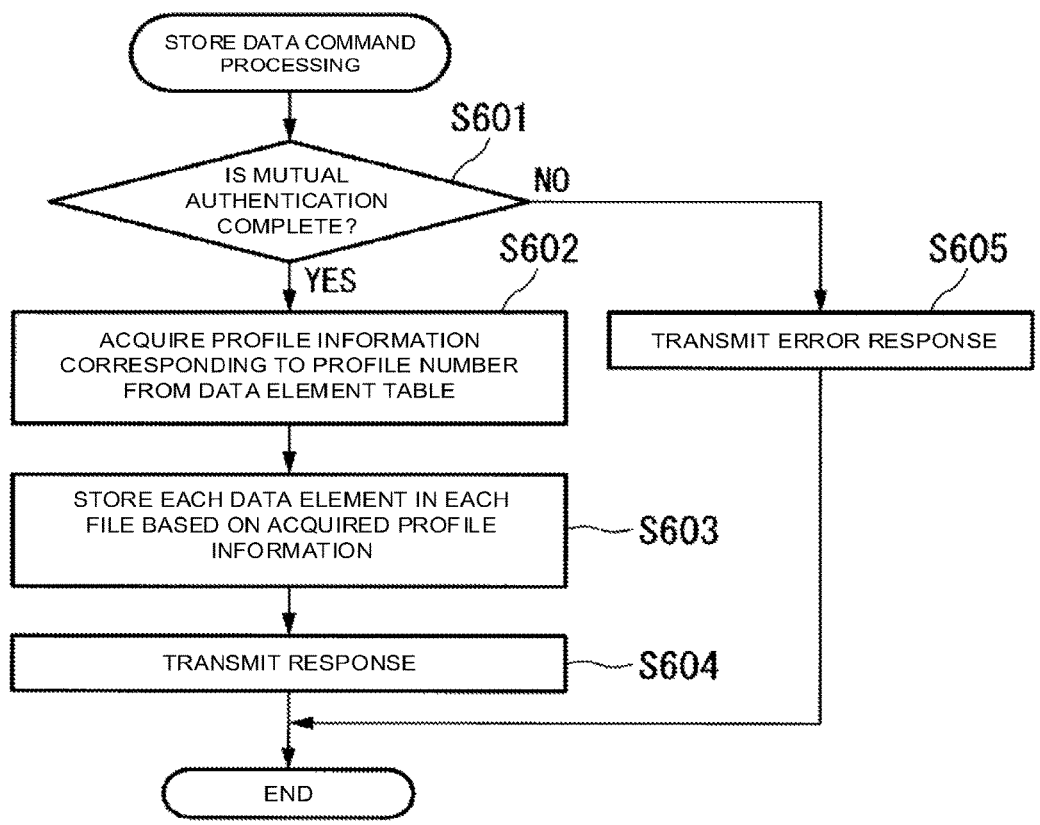
FIG. 12 is a flowchart showing an example of STORE DATA command processing of the IC card of the second embodiment.

FIG. 12 is a flowchart showing an example of the STORE DATA command processing of the IC card 1*a* of this embodiment.

As shown in FIG. 12, the command processing unit 51 of the IC card 1*a* first determines whether or not mutual authentication is complete (step S601). If mutual authentication is complete (step S601: YES), the command processing unit 51 advances the procedure to step S602. If mutual authentication is not complete (step S601: NO), the command processing unit 51 advances the procedure to step S605.

In step S602, the command processing unit 51 acquires profile information corresponding to a profile number from a data element table. Specifically, the command processing unit 51 extracts, from the data element table stored in the table storage 60, the profile information corresponding to the profile number received from the external apparatus 2, and acquires the extracted profile information.

Next, the command processing unit 51 stores data elements in the respective files (EFs), based on the acquired profile information (step S603). Specifically, the command processing unit 51 stores, in the respective EFs, the data elements included in the profile information, based on the profile information, such as that shown in FIG. 5.

Next, the command processing unit 51 transmits a response to the external apparatus 2 (step S604). Specifically, the command processing unit 51 transmits the response that includes information indicating an execution result of the STORE DATA command processing, to the external apparatus 2 via the communication unit 4. After the processing of step S604, the command processing unit 51 ends the STORE DATA command processing.

In step S605, the command processing unit 51 transmits an error response to the external apparatus 2, and ends the STORE DATA command processing. Here, the error response is a response that includes error information indicating that mutual authentication is not complete.

As described above, in the IC card 1*a* according to this embodiment, the command processing unit 51 stores, from a data element table stored in the table storage 60, data elements corresponding to a profile number, in data regions (e.g., EFs) reserved in the data storage 80, in response to a processing request (e.g., a STORE DATA command) that requests issuance processing.

Accordingly, the IC card 1*a* according to this embodiment can reduce the number of times of executing the STORE DATA command, and thus can reduce the time required for issuance, similarly to the first embodiment.

Third Embodiment

Next, an IC card of a third embodiment will be described with reference to the drawings.

In this embodiment, an example will be described in which execution of conventional INSTALL command processing and execution of the INSTALL command processing of the first embodiment are switched in accordance with whether or not the command includes a profile number, in the first embodiment.

Note that the configuration of the IC card 1 of this embodiment is similar to that of the first embodiment shown in FIGS. 1 to 5, and thus its description is omitted.

Figure 13:
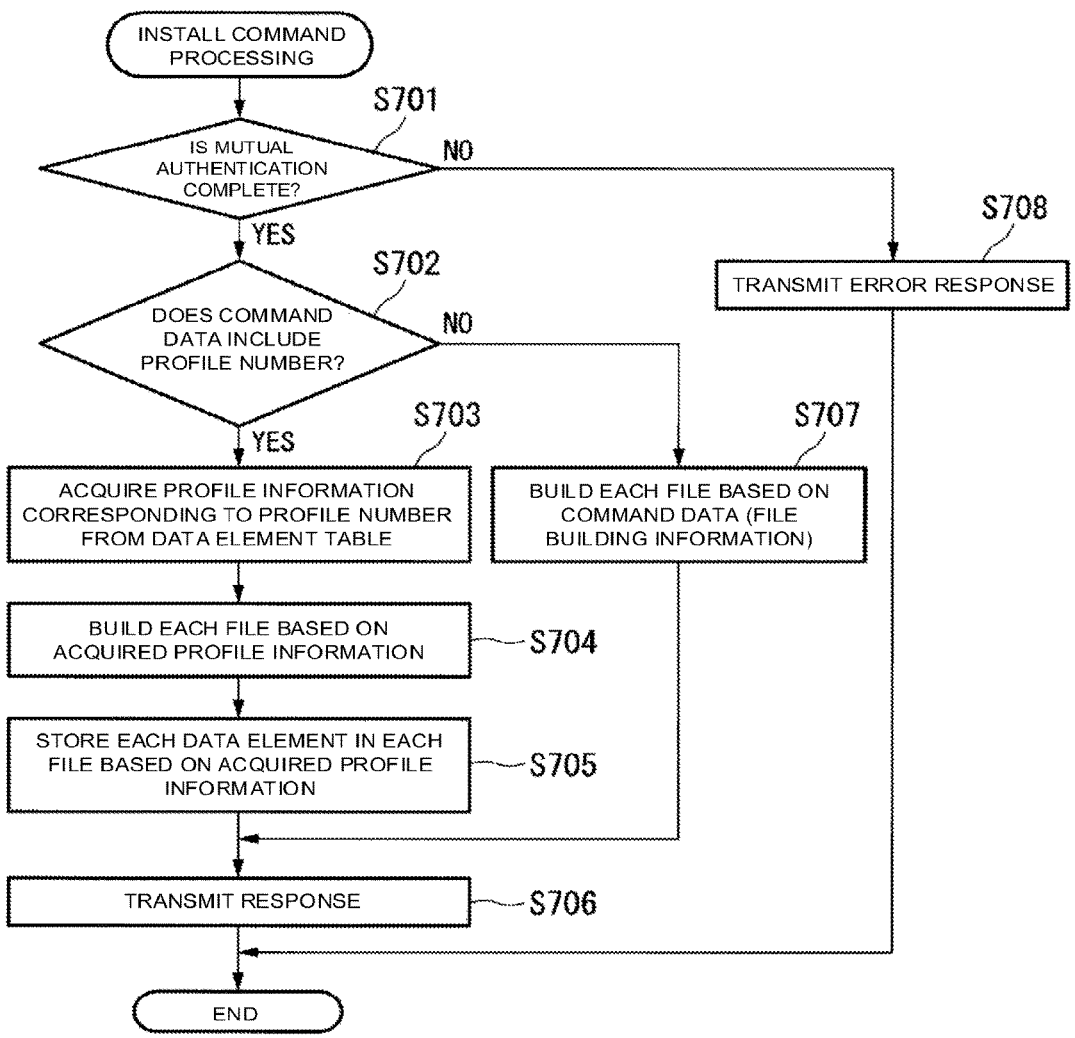
FIG. 13 is a flowchart showing an example of INSTALL command processing of an IC card of a third embodiment.

FIG. 13 is a flowchart showing an example of INSTALL command processing of the IC card 1 of this embodiment.

As shown in FIG. 13, the command processing unit 51 of the IC card 1 first determines whether or not mutual authentication is complete (step S701). If mutual authentication is complete (step S701: YES), the command processing unit 51 advances the procedure to step S702. If mutual authentication is not complete (step S701: NO), the command processing unit 51 advances the procedure to step S708.

In step S702, the command processing unit 51 determines whether or not the INSTALL command includes a profile number. If the INSTALL command includes a profile number (step S702: YES), the command processing unit 51 advances the procedure to step S703. If the INSTALL command does not include a profile number (step S702: NO), the command processing unit 51 advances the procedure to step S707.

The processing of steps S703 to S706 is similar to the above-described processing of steps S302 to S305 shown in FIG. 9, and thus its description is omitted here.

Also, the processing of step S707 is similar to the above-described processing of step S502 shown in FIG. 11, and thus its description is omitted here. Note that if the processing of step S707 is executed, the IC card 1 stores, in each EF, a data element (write data) received from the external apparatus 2, by a STORE DATA command.

Moreover, the processing of step S708 is similar to the above-described processing of step S306 shown in FIG. 9, and thus its description is omitted here.

As described above, in the example shown in FIG. 13, the command processing unit 51 switches between execution of issuance using a data element table and execution of issuance using a conventional STORE DATA command, in accordance with whether or not the INSTALL command includes a profile number. Therefore, the IC card 1 of this embodiment can also be applied to an issuance system that uses the conventional STORE DATA command.

Note that in this embodiment, as an example in which issuance processing is switched and executed in accordance with whether or not a command includes a profile number, an example was described in which switching processing is applied to the INSTALL command of the first embodiment, but similar switching processing may be applied to the STORE DATA command of the second embodiment. Specifically, if an issuance command (e.g., an INSTALL command and an STORE DATA command) does not include a profile number, the command processing unit 51 may store, in data regions (e.g., EFs), data elements (write data) received from the external apparatus 2.

This enables the IC card 1 of this embodiment to execute issuance processing on a conventional issuance system without changing the system.

In the above embodiments, examples were described in which issuance processing that uses a data element table is applied to an INSTALL command and a STORE DATA command as examples of an issuance command, but issuance processing that uses a data element table may be applied to other issuance commands, or a configuration may be adopted in which a dedicated command is provided, and issuance processing that uses a data element table is applied to the dedicated command.

Also, an example was described in which in an STORE DATA command, a profile number is set as "Command Data" (command data), but the profile number may be set as "P1" (parameter 1), or "P2" (parameter 2), for example.

Moreover, in the above-described embodiments, examples were described in which the IC card 1 (1*a*) communicates with the external apparatus 2 via the contact portion 3, but a configuration may be adopted in which the IC card 1 (1*a*) communicates with the external apparatus 2 via a contactless interface that uses a coil or the like.

Moreover, in the above-described embodiments, the IC card 1 (1*a*) is provided with the EEPROM 8 as a rewritable non-volatile memory, but the present invention is not limited thereto. For example, the IC card 1 (1*a*) may be provided with a flash memory, a FeRAM (Ferroelectric Random Access Memory) or the like in place of the EEPROM 8.

Also, in the above-described embodiments, an example was described in which the profile identifier is a profile number, but the profile identifier may be other identification information such as a profile name or a profile ID.

Moreover, the data element table is not limited to the data configuration shown in FIG. 5, and may have another data configuration.

According to at least one embodiment described above, the IC card (IC module) has the table storage 60 that stores a data element table containing profile information in which a profile identifier, data elements included in the profile, and data region identifiers indicating data regions that are reserved in the data storage 80 and store the data elements are associated, as well as the command processing unit 51 that stores the data elements corresponding to the profile identifier, from the data element table stored in the table storage 60, in the data regions indicated by the data region identifiers corresponding to the data elements, in response to a processing request that includes the profile identifier and requests issuance processing, and thereby it is possible to reduce the time required for issuing the IC card.

Note that a configuration may be adopted in which a program for realizing the functions of each of the constituent elements of the IC card 1 (1*a*) of the embodiments is recorded in a computer-readable recording medium, and this program recorded in the recording medium is read and executed by a computer system, whereby processing in each of the above-described constituent elements of the IC card (1*a*) is performed. Here, the computer system reading and executing a program recorded in the recording medium includes installing the program in the computer system. The "computer system" here may include an OS and hardware such as a peripheral device.

Moreover, the "computer-readable recording medium" refers to a portable medium such as a flexible disk, a magneto optical disk, a ROM and a CD-ROM, or a storage apparatus built in a computer system such as a hard disk.

Although some embodiments of the present invention have been described, these embodiments are proposed as examples, and are not intended to limit the scope of the invention. These embodiments can be carried out in various other modes, and omission, replacement, and modification can be made in various forms without departing from the gist of the invention. The embodiments and modifications thereof are encompassed in the scope and the gist of the invention, and are also encompassed in the invention described in the claims and the equivalents thereof.

What is claimed is:

1. An IC module comprising:
   a processor;
   a memory configured to store a program; and
   a communication interface configured to communicate with an external apparatus,
   wherein the memory including:
      a data storage configured to store data;
      a table storage configured to store a data element table containing a plurality of sets of profile information respectively corresponding to a plurality of applications, each set of the profile information including, in association with each other:
         a profile identifier for identifying a profile that is a group of data elements that are stored in the data storage at a time of issuance;
         the data elements included in the profile; and
         data region identifiers indicating data regions that are reserved in the data storage and that stores the data elements, wherein each data region is an elementary file which is used by the application corresponding to the set of the profile information; and
   wherein, when the communication interface receives an install command that includes the profile identifier and requests issuance processing from the external apparatus, the processor functions as a processing unit, by executing the program, configured to build the elementary files in the data storage and store the data elements corresponding to the profile identifier included in the install command, from the data element table stored in the table storage, in the elementary files indicated by the data region identifiers corresponding to the data elements.

2. The IC module according to claim 1, wherein the processing unit is configured to, in response to the install command that requests the issuance processing, reserve, in the data storage, the elementary files that store the data elements, and to store the data elements corresponding to the profile identifier included in the install command, from the data element table stored in the table storage, in the elementary files reserved.

3. The IC module according to claim 1, wherein the processing unit is configured to, in response to the install command that requests the issuance processing, store the data elements corresponding to the profile identifier included in the install command, from the data element table stored in the table storage, in the elementary files reserved in the data storage.

4. The IC module according to claim 1, wherein the processing unit is configured to store the data element table in the table storage, in response to a processing request that requests processing for storing the data element table in the table storage.

5. The IC module according to claim 1, wherein the processing unit is configured to, if an install command that requests the issuance processing does not include any profile identifier, reserve the data regions in the data storage based on file building information received from the external apparatus, and further store the data elements received from the external apparatus in the elementary files.

6. The IC module according to claim 1, wherein the processing unit is configured to, in response to the install command that includes the profile identifier and requests the issuance processing, store the data elements corresponding to the profile identifier included in the install command, from the data element table stored in the table storage, in the elementary files indicated by the data region identifiers corresponding to the data elements, after the data element table is stored in the table storage.

7. The IC module according to claim 1, wherein the communication interface includes a contact portion to communicate with the external apparatus.

8. An IC card comprising:
   an IC module including a processor, a memory configured to store a program, and a communication interface configured to communicate with an external apparatus; and
   a card body in which the IC module is embedded;
   wherein the memory including:
      a data storage configured to store data;
      a table storage configured to store a data element table containing a plurality of sets of profile information respectively corresponding to a plurality of applications, each sets of the profile information including, in association with each other:
         a profile identifier for identifying a profile that is a group of data elements that are stored in the data storage at a time of issuance;
         the data elements included in the profile; and
         data region identifiers indicating data regions that are reserved in the data storage and that stores the data elements, wherein each data region is an elementary file which is used by the application corresponding to the set of the profile information; and
   wherein, when the communication interface receives an install command that includes the profile identifier and requests issuance processing from the external apparatus, the processor functions as a processing unit, by executing the program, configured to build the elementary files in the data storage and store the data elements corresponding to the profile identifier included in the install command, from the data element table stored in the table storage, in the elementary files indicated by the data region identifiers corresponding to the data elements.

* * * * *